(No Model.) 3 Sheets—Sheet 1.
E. J. MOLERA & J. C. CEBRIAN.
SPEED REGULATOR AND REVERSING DEVICE FOR ELECTRIC MOTORS.
No. 275,842. Patented Apr. 17, 1883.
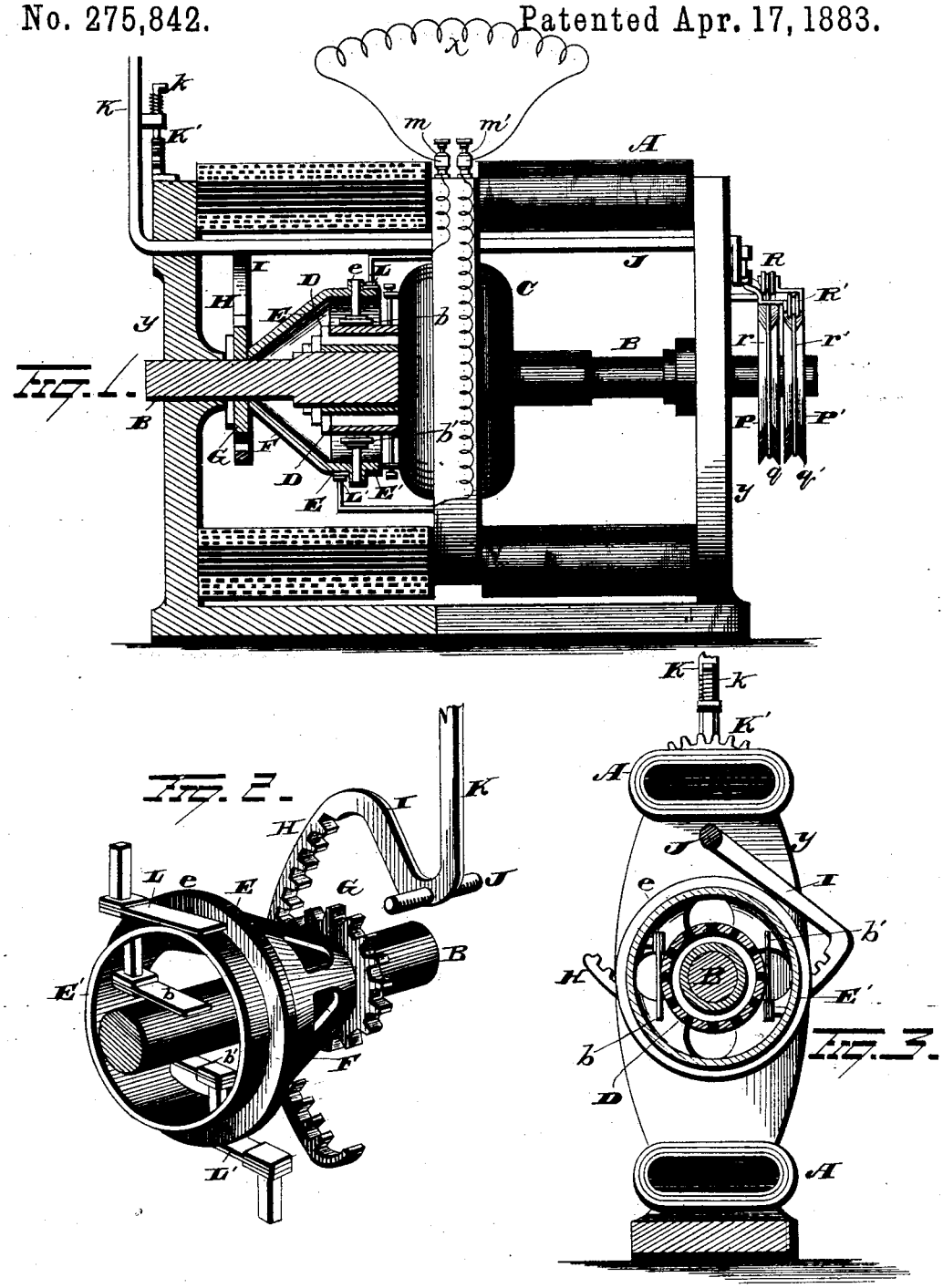

(No Model.) 3 Sheets—Sheet 2.
E. J. MOLERA & J. C. CEBRIAN.
SPEED REGULATOR AND REVERSING DEVICE FOR ELECTRIC MOTORS.
No. 275,842. Patented Apr. 17, 1883.
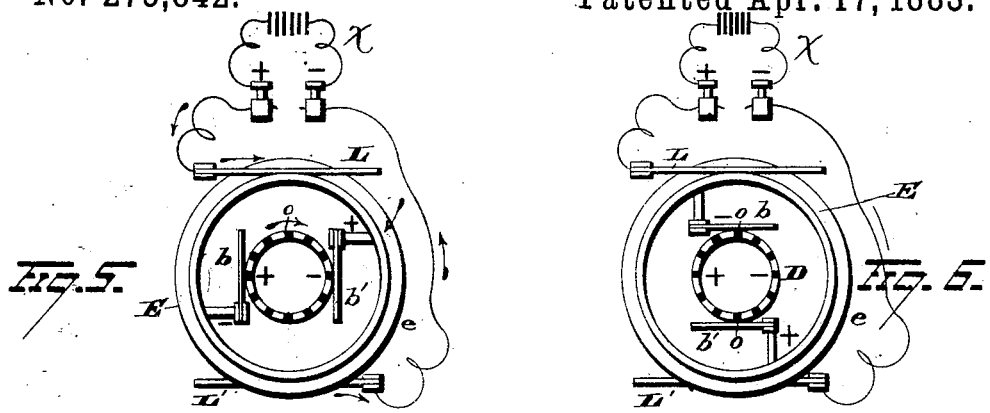
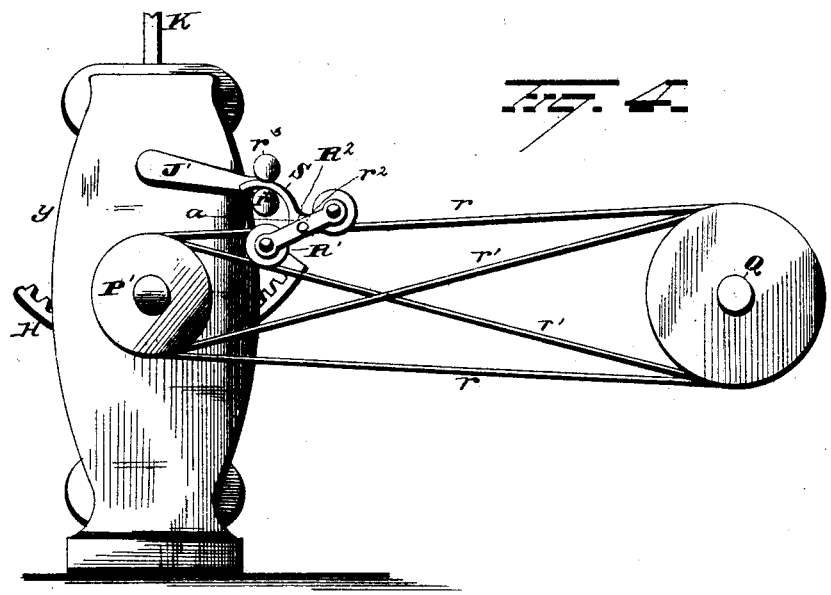
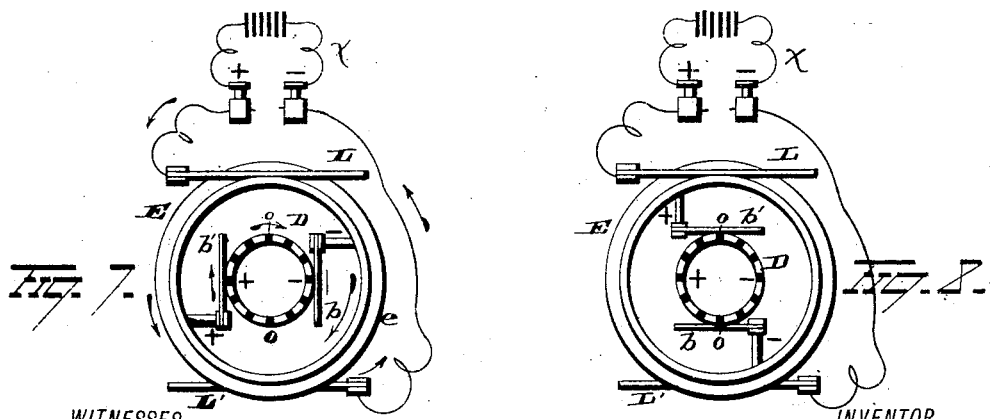
WITNESSES
INVENTOR
Attorney (No Model.) 3 Sheets—Sheet 3.
E. J. MOLERA & J. C. CEBRIAN.
SPEED REGULATOR AND REVERSING DEVICE FOR ELECTRIC MOTORS.
No. 275,842. Patented Apr. 17, 1883.
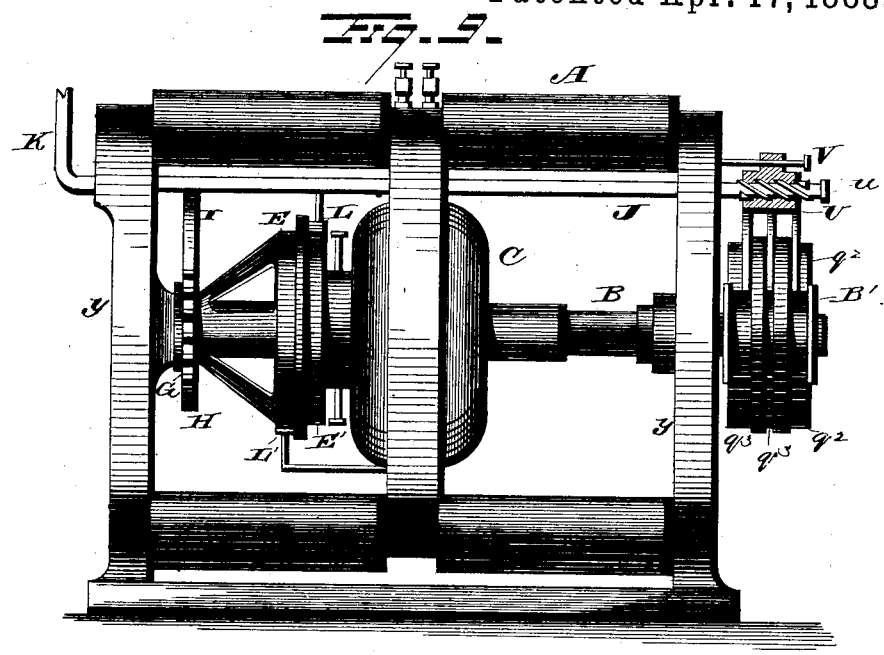
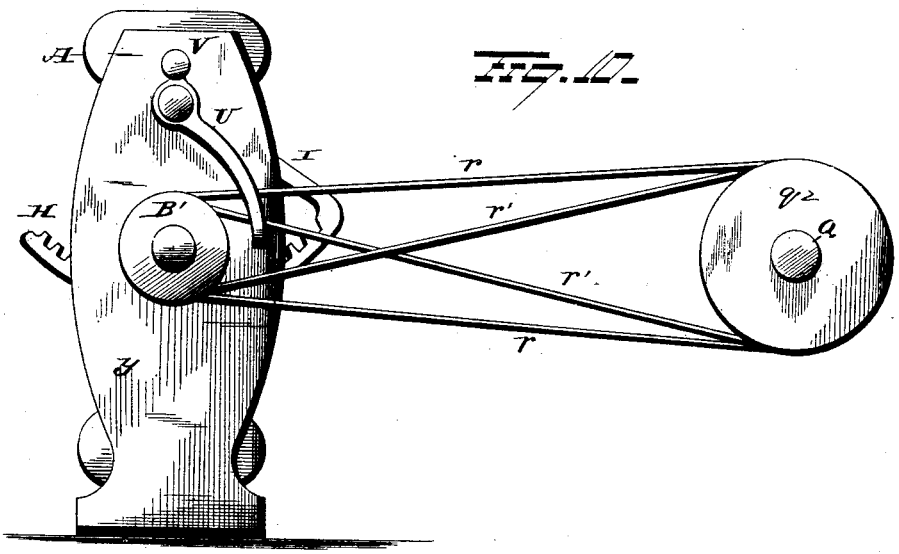

UNITED STATES PATENT OFFICE.

EUSEBIUS J. MOLERA AND JOHN C. CEBRIAN, OF SAN FRANCISCO, CAL.

SPEED-REGULATOR AND REVERSING DEVICE FOR ELECTRIC MOTORS.

SPECIFICATION forming part of Letters Patent No. 275,842, dated April 17, 1883.

Application filed January 26, 1883. (No model.)

*To all whom it may concern:*

Be it known that we, EUSEBIUS J. MOLERA and JOHN C. CEBRIAN, of San Francisco, in the county of San Francisco and State of California, have invented certain new and useful Improvements in Speed-Regulators and Reversing Devices for Electric Motors; and we do hereby declare the following to be a full, clear, and exact description of the invention, such as will enable others skilled in the art to which it pertains to make and use the same.

This invention relates to means for transmitting motion from an electric motor to machinery to be driven thereby, its object being to so combine the motion-transmitting devices and adjustable commutator-brushes of the motor that when the brushes are operated for regulating the speed and moved past the neutral points of the commutator the direction of motion communicated to the driven machine will be reversed, although the direction of the movement of the motor will not be changed.

The improvement is especially designed for application to that class of motors in which the coils are so wound and connected to the commutator that the two halves or divisions of the commutator will be changed in polarity by reversing the direction of the actuating-current. In this class of motors the direction of movement of the armature will not change when the brushes are reversed in position with respect to the neutral points, although the speed decreases and increases as the brushes are caused to approach and recede from the neutral and maximum points, respectively. A complete regulation of the speed may be secured by adjusting the brushes without passing the neutral points, and it is desirable at times to obtain such regulation without reversal of motion transmitted. This we accomplish by arranging the transmitting devices in such relation to the brushes that the former will not be affected for changing direction except at the moment when the latter pass the neutral points in being adjusted.

Our invention consists in certain novel combinations of devices, which will be clearly understood from the following particular description, reference being had to the accompanying drawings, which illustrate the principle thereof, and in which—

Figure 1 is a side view, partly in elevation and partly in section, of an electric motor having our improvement applied thereto. Fig. 2 is a perspective view of the brush-adjusting and speed-regulating devices detached. Fig. 3 is a vertical section. Fig. 4 is an end view of the motor, showing also the motion-transmitting devices as connected with the driving-pulleys of a machine to be driven. Figs. 5, 6, 7, and 8 are diagrams illustrating the various positions of the brushes with respect to the commutator. Fig. 9 is a side view, partly in section, of a motor having a modified construction of transmitting and reversing devices applied thereto. Fig. 10 is an end view of the same.

Referring to Fig. 1, the letter A designates the electric motor, which may have its field-magnets, armature, and commutator constructed in any well-known manner, the coils being so wound that the two divisions of the commutator-plates will be changed in polarity by a change of direction of the actuating-current.

B is the rotary armature-shaft; C, the armature; D, the commutator or collecting cylinder.

E and E' (see also Fig. 2) indicate two metallic drums, which surround the commutator D, the drum E being attached to a collar or thimble, F, which is firmly secured to a gear, G, arranged to rotate freely on the shaft B, and meshing with a segmental rack, H, carried by an arm, I, which projects from a shaft, J, having its bearings in the yoke-pieces $y$ $y$ of the field-magnets, and provided at one projecting end with an operating-lever, K, which is provided with a spring-latch, $k$, arranged to engage with a toothed segment, K', for holding the lever in any position to which it may be adjusted. The connections at the opposite end will be presently described. The drums E and E' are insulated from each other by an interposed ring, $e$, of non-conducting material, to which both the drums are secured, and upon these drums bear the stationary brushes L L', which are in electrical connection with the binding-posts $m$ $m'$, which form the connections of the external circuit of the apparatus. From the inner surfaces of the drums E and E', respectively, project metal studs, which carry brushes $b$ $b'$, arranged to bear upon the commutator D in the usual relation to each other of brushes for delivering a current to an electric motor, and these brushes may be shifted on the commutator to approach and recede from the neutral points, or to approach and cross said points, as desired.

To explain the operation of the brushes, we will refer especially to Fig. 1 and the diagrams 5, 6, 7, and 8. We will suppose that a current of electricity traverses the external circuit, (indicated by X,) and sets the machine in motion in the direction indicated by the arrows in Fig. 5, the brushes $b$ $b'$ being at the points of maximum effect with respect to the commutator, $b$ being the positive and $b'$ the negative brush. Now, if the drums E be by means of the lever K, arm I, segment H, gear G, and thimble F shifted to the right, the brushes will gradually approach the neutral points $o$ $o$, as shown in Fig. 6, and the motion of the machine will become slower and slower until these points are reached, when it will stop altogether. By still further rotating the drums in the same direction, as shown in Fig. 7, the current will begin to flow anew and the machine to rotate, and the polarity of the brushes remaining constant and the polarity of the commutator-plates reversed by receiving the current in an opposite direction from the brushes since they have crossed the neutral points, the motion of the armature will be in the same direction in which it is first started, and will gradually increase in speed as the brushes again approach the maximum points by further rotation of the drums, while a still further rotation to the position shown in Fig. 8 will cause a gradually slowing and final stoppage of motion in the armature.

It will be observed that the increments and decrements of speed could be effected without causing the brushes to cross the neutral and maximum points, by simply causing them to approach and recede from these points, and increase and decrease of speed will be so obtained, when desired to be had, without reversal of the movement of the machine driven; but to accomplish the reversals we have combined with the brushes and their operative means the devices which we will now describe.

Referring to Fig. 1, the letters P and P' indicate two grooved pulleys, fixed upon the projecting end of the armature-shaft B, and arranged to receive round motion-transmitting cords or belts $r$ and $r'$, respectively. Q, Fig. 4, is a rotary shaft to be operated by the electric motor, and may be the driving-shaft of any suitable machine the motion of which is desirable to be occasionally reversed. This shaft Q has fixed upon it two pulleys, $q$ $q'$, the former receiving the belt $r$, which is crossed, as shown, and the latter receiving the belt $r'$, both of these belts being so loose that if left in normal condition they will not transmit motion, even though the pulleys P and P' be in rotation.

R and R' are two tension-pulleys pivoted at the opposite ends of a yoke, R$^2$, which at the middle is fixed to a short rock-shaft, $r^2$, mounted in bearings in an arm, $a$, and having a curved cam-arm, S, projecting as shown. This cam-arm S is clasped between two friction-rollers, $r^3$ and $r^4$, pivoted to a cross-head at the end of an arm, J', which projects laterally from the end of shaft J, and will obviously be moved whenever the said shaft is turned to operate the drums and brushes, as heretofore described.

When the position of the operating-lever K is such that the brushes $b$ $b'$ are at the neutral points of the commutator, as shown in Figs. 6 and 7, the arm J' is in such position that the pulleys $r^3$ $r^4$ will hold the cam-arm S so that the tension-pulleys R R' will not press upon either of the transmitting-belts, and no motion will be transmitted; but when the brushes are shifted in either direction one or the other of the tension-pulleys will be pressed upon its belt, and motion will be transmitted, its direction depending upon which belt is pressed, and the selection of the belt depending upon the direction in which the brushes are shifted. The curve of the cam-arm S is such that the first pressure it causes of either pulley upon its belt is the maximum pressure. It will now be clearly understood that by shifting the brushes from any intermediate point while the machine is in operation the speed will simply be varied according to the direction of the shifting so long as the neutral points are not crossed; but if it is desired to reverse the motion of the driven machine, the brushes will be shifted across the neutral points, and then the tension-pulley which before pressed its belt will be raised and transmission by such belt will cease and the other tension-pulley will be pressed down upon its belt, and a reversed motion be thereby transmitted to the machine.

In Figs. 9 and 10 we show a modification of the devices by which the reversals of motion transmitted are caused. In these figures the armature-shaft B carries a wide drum, B', and the driven shaft Q has fixed upon it two fast pulleys, $q^2$ $q^3$, having a loose pulley, $q^4$, arranged between them. The belts $r$ and $r'$ are respectively crossed and straight, as before described, and the loose pulley $q^4$ is wide enough to receive both, and both also pass around the drum B'. When the belts are both on the loose pulley there can be no transmission of motion; but when either of the belts is shifted upon its adjacent fast pulley motion will be transmitted to shaft Q, and its direction will depend upon which of the belts is so shifted, the other being left upon the loose pulley. The double belt-shifter U, which embraces the belts respectively, hangs from a pin, V, and it can slide laterally in either direction upon the projecting end of the shaft J, which, as in the other modification, operates the brushes of the commutator.

The projecting portion of the shaft J is provided with a screw-thread, $u$, which engages in a corresponding thread in the belt-shifter, and has such a pitch that immediately on turning the shaft J, so as to shift the brushes in either direction from the neutral point one of the belts will be thrown upon a fast pulley of shaft Q, and motion will be transmitted by said belt, its direction depending upon the belt which is so shifted. The operation of these reversing devices will be fully understood from their analogy to the modification first described.

Having now fully described and illustrated the essential principles of our invention, we wish it to be understood that we may vary the mechanical details of construction in any manner to more perfectly accomplish the desired result without departing from the true spirit and scope of our invention.

Having fully described our invention, what we claim as new, and desire to secure by Letters Patent, is—

1. In an electric motor, the combination, with the commutator-brushes and devices for adjusting the same, of devices for changing the direction of motion transmitted from said motor, substantially as described.

2. In an electric motor of the class referred to, the combination, with the commutator-brushes and devices for adjusting the same across the neutral points of the commutator, of motion transmitting and reversing devices connected with the main shaft and arranged to be respectively thrown into and out of action at the moment the brushes cross the neutral points, substantially as and for the purpose set forth.

3. In an electric motor, the combination, with the armature-shaft, the shaft J, and intermediate connections for operating the commutator-brushes, of the transmitting and reversing belts, arranged substantially as described with relation to the motor-shaft and driven shaft, of devices operated by said shaft J for throwing said belts into or out of action, substantially as described, and for the purpose set forth.

4. In an electric motor, the combination, with the commutator, the divisions of which are arranged to change polarity by a change of direction in which they receive the current, of the brushes arranged to be adjusted toward, across, and from the neutral points, and motion transmitting and reversing devices connected with the main shaft of the motor, and also in mechanical connection with the brushes, substantially as described, the whole being arranged in such a manner that when the brushes cross the neutral points the direction of transmitted motion will be reversed.

5. The combination, with the armature-shaft, the shaft J, and its intermediate connections for operating the commutator-brushes, of the belt-drum arranged on the armature-shaft, and the double belt-shifter connected by screw-thread engagement with said shaft which operates the brushes, substantially as described.

In testimony whereof we have signed this specification in the presence of two subscribing witnesses.

EUSEBIUS J. MOLERA.
JOHN C. CEBRIAN.

Witnesses to E. J. Molera's signature:
GEORGE COOK,
W. B. HALE.

Witnesses to J. C. Cebrian's signature:
F. O. WEGENER,
LOUIS PROLL, Jr.